(12) United States Patent
Kataeva et al.

(10) Patent No.: US 10,332,004 B2
(45) Date of Patent: Jun. 25, 2019

(54) MEMRISTIVE NEUROMORPHIC CIRCUIT AND METHOD FOR TRAINING THE MEMRISTIVE NEUROMORPHIC CIRCUIT

(71) Applicants: DENSO CORPORATION, Kariya, Aichi-pref. (JP); The Regents of the University of California, Oakland, CA (US)

(72) Inventors: Irina Kataeva, Nagoya (JP); Dmitri B. Strukov, Goleta, CA (US); Farnood Merrikh-Bayat, Goleta, CA (US)

(73) Assignees: DENSO CORPORATION, Kariya (JP); The Regents of the University of California, Oakland, CA (US)

( * ) Notice: Subject to any disclaimer, the term of this patent is extended or adjusted under 35 U.S.C. 154(b) by 832 days.

(21) Appl. No.: 14/797,284

(22) Filed: Jul. 13, 2015

(65) Prior Publication Data
US 2017/0017879 A1    Jan. 19, 2017

(51) Int. Cl.
*G06E 1/00* (2006.01)
*G06N 3/08* (2006.01)
*G06F 11/07* (2006.01)
*G06N 3/063* (2006.01)

(52) U.S. Cl.
CPC ........... *G06N 3/084* (2013.01); *G06F 11/079* (2013.01); *G06F 11/0721* (2013.01); *G06N 3/063* (2013.01)

(58) Field of Classification Search
CPC .... G06N 3/084; G06F 11/0721; G06F 11/079
USPC .............................................. 706/21, 41, 15
See application file for complete search history.

(56) References Cited

U.S. PATENT DOCUMENTS

| | | | | |
|---|---|---|---|---|
| 5,517,600 A | * | 5/1996 | Shimokawa | G06N 3/063 706/15 |
| 5,649,069 A | * | 7/1997 | Gobert | G06N 3/063 706/41 |
| 9,779,355 B1 | * | 10/2017 | Leobandung | G06N 3/084 |
| 9,792,547 B2 | * | 10/2017 | Nishitani | G06N 3/063 |
| 2010/0223220 A1 | | 9/2010 | Modha et al. | |
| 2010/0299296 A1 | | 11/2010 | Modha et al. | |
| 2010/0299297 A1 | | 11/2010 | Breitwisch et al. | |
| 2011/0004579 A1 | * | 1/2011 | Snider | G06N 3/049 706/25 |
| 2011/0153533 A1 | | 6/2011 | Jackson et al. | |
| 2012/0011088 A1 | | 1/2012 | Aparin et al. | |

(Continued)

OTHER PUBLICATIONS

U.S. Appl. No. 14/797,266, filed Jul. 13, 2015, Kataeva et al.

(Continued)

*Primary Examiner* — Connie C Yoha
(74) *Attorney, Agent, or Firm* — Posz Law Group, PLC

(57) ABSTRACT

A neural network is implemented as a memristive neuromorphic circuit that includes a neuron circuit and a memristive device connected to the neuron circuit. An input voltage is sensed at a first terminal of a memristive device during a feedforward operation of the neural network. An error voltage is sensed at a second terminal of the memristive device during an error backpropagation operation of the neural network. In accordance with a training rule, a desired conductance change for the memristive device is computed based on the sensed input voltage and the sensed error voltage. Then a training voltage is applied to the memristive device. Here, the training voltage is proportional to a logarithmic value of the desired conductance change.

22 Claims, 9 Drawing Sheets

(56) References Cited

U.S. PATENT DOCUMENTS

| | | |
|---|---|---|
| 2012/0011090 A1 | 1/2012 | Tang et al. |
| 2012/0011091 A1 | 1/2012 | Aparin et al. |
| 2012/0016829 A1* | 1/2012 | Snider .................... G06N 3/063 706/27 |
| 2012/0173471 A1 | 7/2012 | Ananthanarayanan et al. |
| 2012/0265719 A1 | 10/2012 | Modha et al. |
| 2013/0311413 A1* | 11/2013 | Rose .................... G06N 3/0635 706/25 |
| 2014/0122402 A1* | 5/2014 | Bichler ................ G06N 3/0635 706/27 |
| 2014/0129498 A1* | 5/2014 | Bichler ................ G06N 3/049 706/25 |
| 2014/0358513 A1* | 12/2014 | Kaplan ................ G06N 99/005 703/11 |
| 2017/0011290 A1* | 1/2017 | Taha ...................... G06N 3/08 |
| 2017/0040054 A1* | 2/2017 | Friedman ............ G11C 13/004 |
| 2017/0061281 A1* | 3/2017 | Gokmen ................ G06N 3/084 |
| 2017/0091616 A1* | 3/2017 | Gokmen ................ G06F 17/16 |
| 2017/0098156 A1* | 4/2017 | Nino ...................... G06N 3/049 |
| 2017/0109628 A1* | 4/2017 | Gokmen ............. G06N 3/0472 |

OTHER PUBLICATIONS

Krizhevsky et al. "ImageNet Classification with Deep Convolutional Neural Networks." 2012.

Ciresan et al. "Multi-column Deep Neural Networks for Image Classification." 2012.

Alibart et al. "High-Precision Tuning of State for Memristive Devices by Adaptable Variation-Tolerant Algorithm", Nanotechnology, vol. 23, p. 075201, 2012. Discussed on p. 2 of the specification.

Alibart et al. "Pattern classification by memristive crossbar circuits using ex situ and in situ training", Nature Comm., vol. 4, 2013. Discussed on p. 2 of the specification.

Alibart et al. "Pattern classification by memristive crossbar circuits using ex situ and in situ training", Nature Comm., vol. 4, 2013, Supplementary Methods.

Merrikh-Bayat et al. "Phenomenological Modeling of Memristive Devices", accepted to Applied Physics A, 2014. Discussed on p. 2 of the specification.

Likharev. "CrossNets: Neuromorphic Hybrid CMOS/Nanoelectronic Networks", Science of Advanced Materials, vol. 3, pp. 322-331, Jun. 2011. Discussed on p. 2 of the specification.

Glorot et al. "Understanding the difficulty of training deep feedforward neural networks." Proceedings of the 13th International Conference on Artificial Intelligence and Statistics (AISTATS) 2010, Sardinia, Italy, vol. 9 of JMLR: W&CP9.

LeCun et al. "Efficient BackProp", Neural Networks: Tricks of the Trade (G. Orr and M. K., eds.), Springer, 1998. Discussed on p. 2 of the specification.

* cited by examiner

MEMRISTIVE NEUROMORPHIC CIRCUIT AND METHOD FOR TRAINING THE MEMRISTIVE NEUROMORPHIC CIRCUIT

TECHNICAL FIELD

The present disclosure relates to a memristive neuromorphic circuit implementation of a neural network, and relates to a method for training the memristive neuromorphic circuit.

BACKGROUND

Artificial neural networks have long been used in the field of artificial intelligence as models of biological neural processing. In the past, neural networks have been implemented in software coupled with traditional Von Neumann architecture computing hardware, such as central processing units (CPUs) or graphic processing units (GPUs). Such implementations may require vast amounts of storage space and power.

Accordingly, there has been pressure over the years to move toward using more efficient, specialized hardware technologies. More recently, hybrid complementary metal-oxide semiconductor (CMOS) circuits with integrated memristive devices, also referred to as "memristors", have emerged as one alternative [1]. Memristive devices are well-suited for implementing synaptic weights in neural networks due to their resistive switching characteristics being able to model the synaptic weights in analog form. However, neural networks with integrated memristive devices introduce new challenges in training the neural networks in view of non-linear kinetics present in typical memristive devices [2].

One approach has been to implement ex-situ training where a simulated neural network is trained in software, and the weights are then imported into the CMOS-memristive hardware [3]. However, there is a concern this approach may not adequately account for hardware variability since online training is not performed. As a result, there is a concern that the hardware neural network may underperform with respect to the software simulation.

Conversely, one approach for implementing in-situ training of CMOS-memristive hardware includes performing closed-loop, tuning controls to account for the non-linear kinetics of memristive devices [3, 4]. In this case, there is a concern that this in-situ training approach may not be viable for more complex many-layer neural networks or complex training algorithms (e.g., backpropagation [5]). This is because closed-loop, tuning control processes may be time-consuming and the feedback circuitry is complex. As a result, there is a concern that this approach may not scale at a practical rate.

For the above reasons, recent in-situ training of CMOS-memristive hardware focuses mainly on spike-timing-dependent plasticity (STDP) or delta-rule [3] for learning. However, these training rules may not provide a robust solution for more demanding applications (e.g., automotive or aerospace), since backpropagation is widely regarded as the fundamental training algorithm for many-layer neural networks [5].

INCORPORATED BY REFERENCE

[1] K. K. Likharev, "*CrossNets: Neuromorphic hybrid CMOS/nanoelectronic networks*", Sci. Adv. Mater., vol. 3, pp. 322-331, June 2011.

[2] F. Merrikh-Bayat et al. "*A phenomenological model of memristive behavior in Pt/TiO$_{2-x}$/Pt devices*", accepted to Applied Physics A, 2014.

[3] F. Alibart et al., "*Pattern classification by memristive crossbar circuits using ex-situ and in-situ training*", Nature Comm., vol. 4, art. 2071, 2013.

[4] F. Alibart et. al., "*High precision tuning of state for memristive devices by adaptable variation-tolerant algorithm*", Nanotechnology, vol. 23, p. 075201, 2012.

[5] Y. LeCun et. al., "Efficient backprop," in Neural Networks: Tricks of the trade (G. Orr and M. K., eds.), Springer, 1998.

SUMMARY

In a first aspect of the present disclosure, there is provided a method for training a memristive neuromorphic circuit. The method includes sensing an input voltage at a first terminal of a memristive device during a feedforward operation of a neural network, the neural network including the memristive device and a neuron circuit connected to the memristive device. The method further includes sensing an error voltage at a second terminal of the memristive device during an error backpropagation operation of the neural network. The method further includes computing, in accordance with a training rule, a desired conductance change for the memristive device based on the sensed input voltage and the sensed error voltage. And, the method further includes applying a training voltage to the memristive device, the training voltage being proportional to a logarithmic value of the desired conductance change.

In a second aspect of the present disclosure, there is provided a memristive neuromorphic circuit for implementing a neural network. The memristive neuromorphic circuit includes a memristive device, a neuron circuit connected to the memristive device, and a controller including a processor and a memory. The controller is programmed to sense an input voltage at a first terminal of the memristive device during a feedforward operation, sense an error voltage at a second terminal of the memristive device during an error backpropagation operation, compute a desired conductance change for the memristive device based on the sensed input voltage and the sensed error voltage, and apply a training voltage to the memristive device, the training voltage being proportional to a logarithmic value of the desired conductance change.

Still other objects, advantages, and features of the present disclosure will become apparent after considering the specification and drawings.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

A first embodiment of the present description will be explained with reference to FIGS. 1 to 6.

Figure 1:
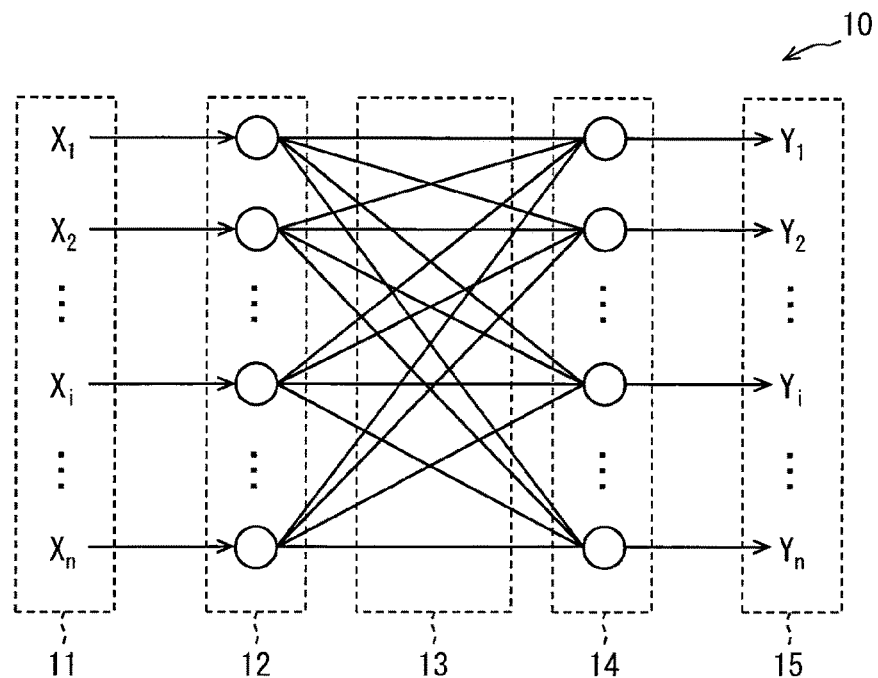
FIG. 1 is a schematic view showing a neural network in accordance with the present disclosure.

FIG. 1 is a schematic view showing an artificial neural network 10. The neural network 10 includes inputs 11, input neurons 12, weights 13, output neurons 14, and outputs 15. Here, FIG. 1 shows a representative pair of layers of the neural network 10. In other words, while FIG. 1 shows one input layer and one output layer, the input neurons 12 may be receiving the inputs 11 as output from a previous layer of neurons (not illustrated). Similarly, the output neurons 14 may be outputting the outputs 15 to be input to a subsequent layer of neurons (not illustrated). Accordingly, the terms "input" and "output" as used herein are relative terms, meaning the input neurons 12 may be a first layer or a hidden layer, and similarly the output neurons 14 may be a last layer or a hidden layer.

The inputs 11 include individual inputs $x_1$, $x_2$, and so on, up to $x_n$, and are input to respective ones of the input neurons 12. The input neurons 12 are in turn connected to the output neurons 14 via weights 13, which are sometimes referred to as synapses. Then, the outputs 15 are output from the output neurons 14. Specifically, each of the output neurons 14 is configured to output respective individual outputs $y_1$, $y_2$, and so on, up to $y_n$. The input neurons 12 and the output neurons 14 are sometimes referred to as nodes, and the weights 13 are sometimes referred to as synapses.

In FIG. 1, the input neurons 12 and the output neurons 14 are shown in a non-recurrent, completely connected configuration. However, this typology is exemplary, and various other typologies are contemplated. "Exemplary" as used herein means "serving as an example", and is not necessarily to be construed as a preferred or advantageous aspect.

Figure 2:
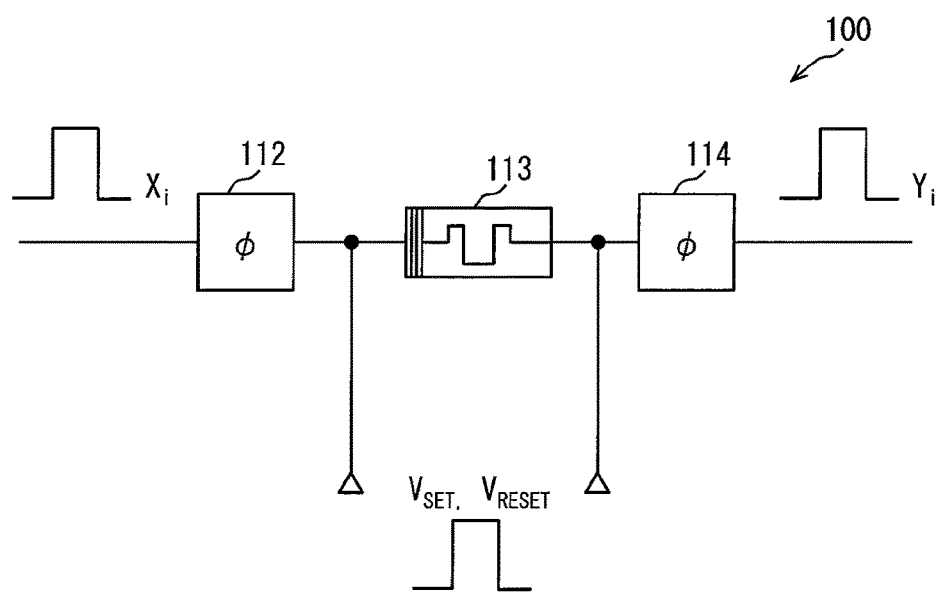
FIG. 2 is a schematic view showing a memristive neuromorphic circuit in accordance with a first embodiment of the present disclosure.

In the present embodiment, the neural network 10 is physically implemented as a memristive neuromorphic circuit 100, which is a hybrid CMOS-memristive type circuit. FIG. 2 is a schematic view showing a portion of the memristive neuromorphic circuit 100 in accordance with the present embodiment. The memristive neuromorphic circuit 100 includes an input neuron 112 that is connected through a memristive device 113 to an output neuron 114. The input $x_i$ and the output $y_i$ are voltage signals. Here, the input neuron 112 and the output neuron 114 are CMOS devices. The input neuron 112 is physically implemented as a neuron circuit. Specifically, the input neuron 112 is preferably an integrated circuit (IC) having an activation function φ (or input-output function) that transforms the input $x_i$. The activation function φ may be linear, m logistic sigmoid, hyperbolic tangent, rectified linear, or any one of a variety of activation functions. The activation function φ may be the same for the input neuron 112 and the output neuron 114, or may be different.

The input neuron 112 outputs the transformed voltage signal to the memristive device 113. In addition, the input neuron 112 may include a summing function, in advance of the activation function φ, that sums all signals input thereto. Alternatively, the summing function may be implemented as a separate circuit (e.g., a summing op-amp circuit). In this present embodiment, the output neuron 114 is also implemented as a neuron circuit, and has the same configuration as the input neuron 112. However, this is not limiting, and the configuration of the output neuron 114 may differ, e.g., by including or not including a summing function. Sensing circuitry (not illustrated) is preferably provided to read the inputs and outputs of the input neuron 112 and the output neuron 114.

Still referring to FIG. 2, the memristive device 113 in the present embodiment is a bipolar memristive device having a conductance G that is adjustable, reversibly and continuously, between a minimum value $G_{MIN}$ and a maximum value $G_{MAX}$. In the present embodiment, the memristive device 113 is preferably a Pt/TiO$_{2-x}$/Pt metal oxide device, but may be alternatively implemented as a different metal oxide device, a phase change memory, a magnetic tunnel junction memory cell, a solid state resistive switching device, or the like.

The conductance G of the memristive device 113 acts as a weight $w_i$ in the neural network 10. Specifically, when the neural network 10 classifies a pattern, an input voltage signal from the input neuron 112 is linearly scaled by the conductance G of the memristive device 113, in accordance with Ohm's law, and sent to the output neuron 114. Similarly, if the neural network 10 is trained by, e.g., backpropagation, when an error is backpropagated through the neural network 10, an error signal from the output neuron 114 is linearly scaled by the conductance G of the memristive device 113 and sent to the input neuron 112. During training of the neural network 10, the conductance G of the memristive device 113 may be modified in accordance with a training rule. In the present embodiment, the training rule is preferably backpropagation, but may be any training rule as known in the field of artificial neural networks.

Generally, the conductance G of the memristive device 113 is increased (or SET) when a negative training voltage $V_{SET}$ is applied, and is decreased (or RESET) when a positive training voltage $V_{RESET}$ is applied. Hereinafter, for simplicity, $V_{SET}$ and $V_{RESET}$ will be explained with reference to their amplitudes where signage is not explicitly mentioned. In FIG. 2, $V_{SET}$ and $V_{RESET}$ are shown as being applied directly to the memristive device 113. This is done so that the $V_{SET}$ and $V_{RESET}$ voltages signals themselves are not transformed by the activation functions φ of the input neuron 112 and the output neuron 114. Alternatively, if the input neuron 112 and the output neuron 114 are configured with linear, or mostly linear, activation functions φ, the $V_{SET}$ and $V_{RESET}$ voltage signals may be transmitted through the input neuron 112 and the output neuron 114 instead.

In general, a conductance change ΔG in the memristive device 113 is dependent on the integral of a training voltage V applied thereto. However, the internal kinetics of the memristive device 113 are highly non-linear, and as a result, the conductance change ΔG in the memristive device 113 is also dependent on the instantaneous conductance G of the memristive device 113 itself. Specifically, ΔG may be given as:

$$\Delta G = f(G, V, \Delta t) \quad (1)$$

where G is the instantaneous conductance of the memristive device 113 itself, V is the training voltage signal applied (encompassing both the amplitude and the sign of the training voltage signal), and Δt is the duration of the training voltage signal applied. Hereinafter, for simplicity, ΔG will be explained with reference to its magnitude where signage is not explicitly mentioned.

Figure 3:
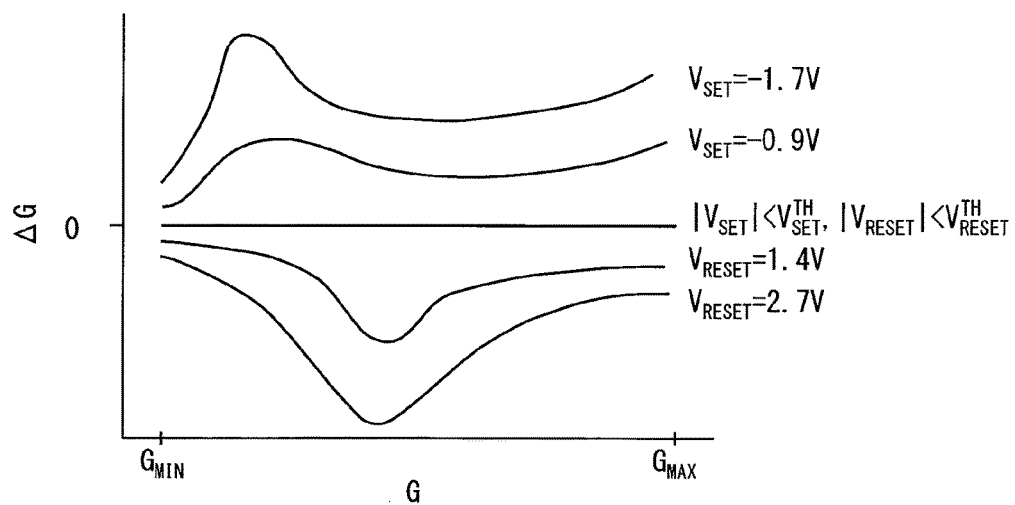
FIG. 3 is a graph showing conductance change curves for a memristive device.

FIG. 3 illustrates exemplary conductance change curves of a number of different training voltage signals when applied to the memristive device 113 over a range of instantaneous conductance G of the memristive device 113. Specifically, FIG. 3 shows the relationship between conductance change ΔG and instantaneous conductance G when training voltage signals of various amplitudes are applied to the memristive device 113.

In FIG. 3, all training voltage signals are applied for a predetermined duration Δt (e.g., 10 μs) to isolate the effects of the amplitude and sign of the applied training voltage signal. It should be noted that the training voltage signals shown in FIG. 3 are arbitrarily selected for exemplary purposes, and therefore should not be construed as limiting. Similarly, the specific shapes of the conductance change curves in FIG. 3, while typical, are nevertheless memristive device-specific and therefore exemplary in nature as well. For example, in a different memristive device but equally applicable to the present embodiment, the conductance change curve of $V_{SET}$ may decrease as the instantaneous conductance G approaches $G_{MAX}$.

As shown in FIG. 3, for any given training voltage signal, the conductance change ΔG of the memristive device 113 depends on the instantaneous conductance G of the memristive device 113 itself. Further, at any instantaneous conductance G of the memristive device 113 itself, the conductance change ΔG of the memristive device 113 depends on both the magnitude and the sign of the applied training voltage signal. Moreover, the conductance change curves show that the conductance change ΔG of the memristive device 113 is not linear with respect to any of these parameters.

FIG. 3 also shows that when $V_{SET}$ is below a threshold voltage $V_{SET}^{TH}$, or when $V_{RESET}$ is below a threshold voltage $V_{RESET}^{TH}$, the conductance change ΔG of the memristive device 113 is zero for the entire range of G. This particular non-linearity is useful by allowing the conductance G of the memristive device 113 to be, selectively, read (i.e., by applying a voltage signal below the threshold voltages) or written (i.e., by applying a voltage signal above the threshold voltages). Specifically, when reading with a voltage signal below the threshold voltages, the instantaneous conductance G of the memristive device 113 is not disturbed.

More specifically, when reading the conductance G of the memristive device 113, a read voltage $V_{READ}$ with an amplitude equal to or less than a read threshold voltage $V_{READ}^{TH}$ is applied to the memristive device 113. Here, because conductance is a non-directional property and may be measured in either direction using Ohm's law, the directionality of $V_{READ}$ may be configured as either positive or negative. When $V_{READ}$ is configured as a positive signal, the amplitude of $V_{READ}^{TH}$ is set to be equal to or less than that of $V_{RESET}^{TH}$. Conversely, when $V_{READ}$ is configured as a negative signal, the amplitude of $V_{READ}^{TH}$ is set to be equal to or less than that of $V_{SET}^{TH}$. Since the directionality of $V_{READ}$ may be arbitrarily set, $V_{READ}$ as used hereinafter may refer to either a positive or negative read signal.

In practice, $V_{READ}^{TH}$ is generally set to be lower than $V_{SET}^{TH}$ or $V_{RESET}^{TH}$ by a safety margin, so that when reading the conductance G of the memristive device 113, the conductance G of the memristive device 113 is not inadvertently changed. This is because the values of $V_{SET}^{TH}$ and $V_{RESET}^{TH}$ may vary across multiple memristive devices, and may also vary over different durations Δt of the applied voltage signal. In one exemplary configuration, a particular Pt/TiO$_{2-x}$/Pt metal oxide device is found to have $V_{SET}^{TH}$ and $V_{RESET}^{TH}$ values of −0.8V and 1.35V, respectively. To ensure a safety margin when reading the conductance G of this particular Pt/TiO$_{2-x}$/Pt metal oxide device, the magnitude of the read threshold voltage $V_{READ}^{TH}$ is set to be 0.5V, i.e., substantially lower than the nominal values for $V_{SET}^{TH}$ and $V_{RESET}^{TH}$. Here, a variety of safety margins may be used, and other configurations using larger or smaller safety margins, or using no safety margin at all, are also contemplated.

In order to simplify the following explanations, a generic term "$V^{TH}$" will be used below to generally refer to $V_{READ}^{TH}$, $V_{SET}^{TH}$, and $V_{RESET}^{TH}$. Specifically, for both SET and RESET processes, ΔG=0 when applying a voltage below $V^{TH}$, and |ΔG|>0 when applying a voltage above $V^{TH}$.

Returning to FIG. 3, as explained above, all of the conductance change curves are obtained from voltage signals applied for a same predetermined duration Δt. Here, changing the duration Δt of the voltage signals may be approximated as linearly scaling a resulting conductance change ΔG. In other words, the amplitudes of the conductance change curves depicted in FIG. 3 would be scaled by a linear factor over the entire range of G. This is because, in the present embodiment, the magnitude of the conductance change ΔG is sufficiently small when compared to the entire range of G that the rate of change in conductance ΔG/Δt is approximately constant over the duration Δt of an applied training voltage.

In order to account for the above-discussed non-linearities, the neural network 10 of the present embodiment is preferably trained by using a conductance map that maps V with ΔG for both $V_{SET}$ and $V_{RESET}$, such that given a desired ΔG, a corresponding $V_{SET}$ or $V_{RESET}$ may be obtained. It should be noted that in typical memristive devices, V is proportional to a logarithmic value of ΔG. For this reason, the present embodiment preferably uses a conductance map that maps V with ΔG in the form of:

$$V = a * \log_c(\Delta G') + b \quad (2)$$

where a, b, and c are predetermined parameters that are memristive device-specific, and ΔG' is ΔG normalized over the range of [0,1]. This normalization process is a formality to accommodate the logarithmic function and is typical for logarithmic mapping. For brevity, the logarithmic function in Equation (2) will be referred to as log( ) in the following explanations and drawings.

Figure 4:
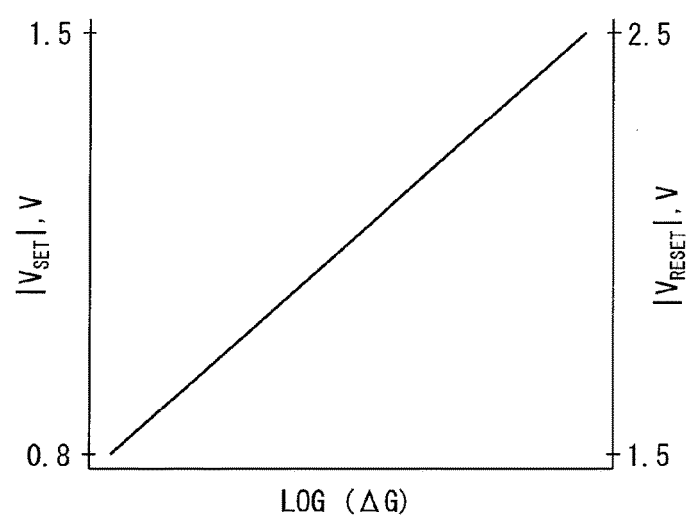
FIG. 4 is a graph showing a conductance map that maps V to ΔG.

In the present embodiment, the conductance map may be obtained in any manner. For example, the conductance map may be obtained by manual characterization of a specific memristive device. In any case, the specifics of the manner in which the conductance map is obtained are unimportant here. An exemplary conductance map is shown in graph form in FIG. 4, where the amplitudes of $V_{SET}$ and $V_{RESET}$ are proportional to the log of a normalized value of $\Delta G$ in accordance with Equation (2). The example of FIG. 4 is illustrative and device-specific, and thus should not be construed as limiting.

Figure 5:
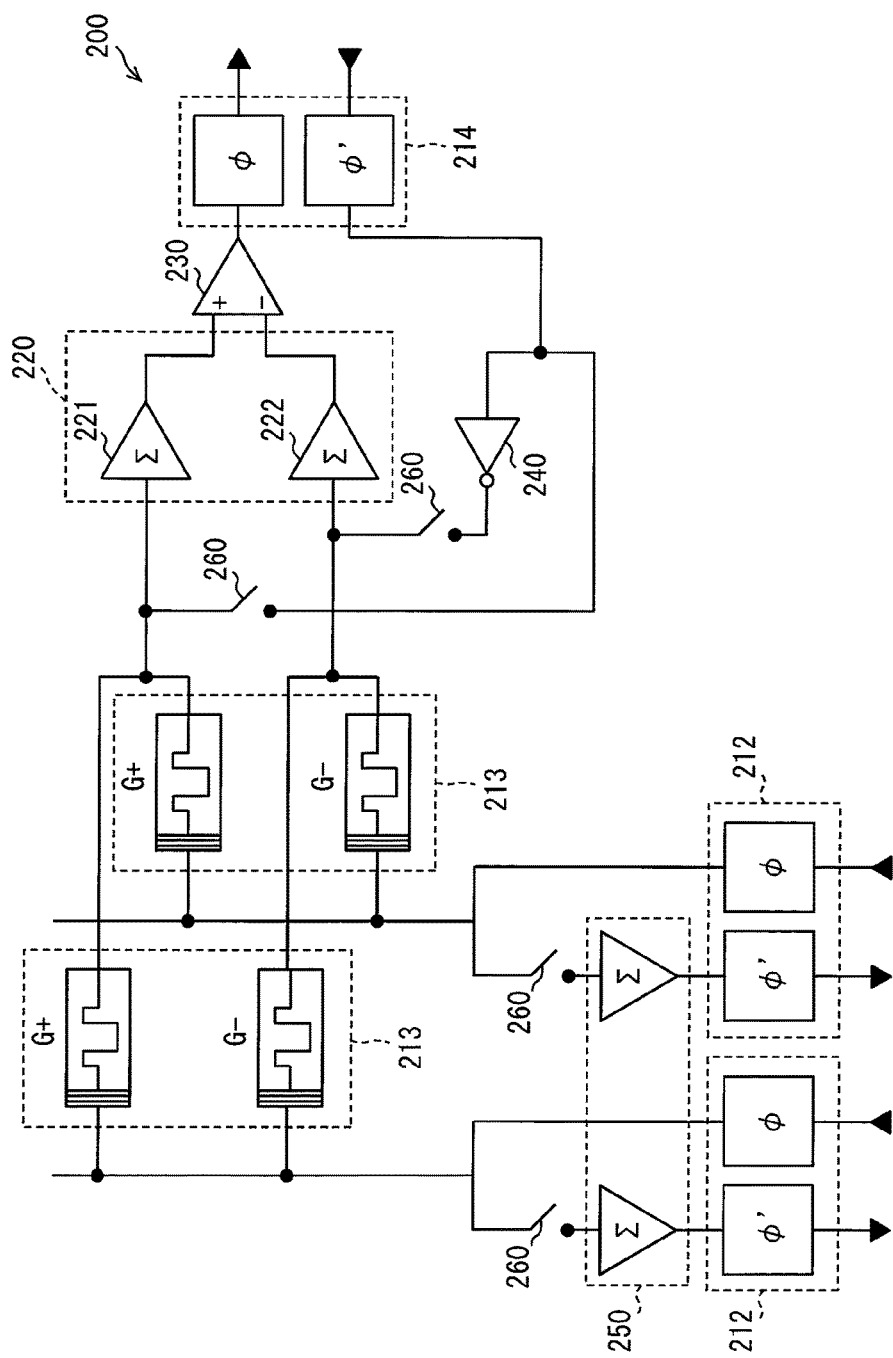
FIG. 5 is a schematic view showing the memristive neuromorphic circuit of the first embodiment with circuit elements for feedforward and error backpropagation.

The neural network 10 of the present embodiment is preferably trained by backpropagation training, sometimes referred to as "backpropagation" or simply "backprop". FIG. 5 is a circuit diagram showing an exemplary electrical configuration of an memristive neuromorphic circuit 200 in accordance with the present embodiment. The memristive neuromorphic circuit 200 includes a plurality of input neurons 212, a plurality of output neurons 214 (with one illustrated for simplicity), and a plurality of weights (differential pairs 213) that connect the input neurons 212 to the output neuron 214. In FIG. 5, the individual configurations and properties of the input neurons 212, the output neuron 214, and each memristive device in the differential pairs 213 are preferably the same as those shown in FIG. 2. Further, as before, the terms "input" and "output" as used herein are relative terms, meaning the input neurons 212 may be a first layer or a hidden layer, and similarly the output neuron 214 may be a last layer or a hidden layer.

As known to those skilled in the art, backpropagation training typically includes three steps. First, during feedforward (sometimes referring to as a "forward pass"), the neural network 10 is used to classify an input pattern where the input signals propagate in a direction from the input neurons 212 to the output neuron 214. Then, during backpropagation, error signals are backpropagated in a direction from the output neuron 214 to the input neurons 212. Finally, during training, the weights 13 of the neural network 10 are trained according to:

$$\Delta G = \varepsilon * x * e \quad (3)$$

wherein $\Delta G$ is a desired change in conductance, $\varepsilon$ is a learning rate that may be arbitrarily set, x is the input from the previous layer, and e is the error backpropagated from the next layer.

If the output neuron 214 is in the last layer, its error $e_{last}$ is given by:

$$e_{last} = \phi'(y_{desired} - y) \quad (4)$$

where $\phi'$ is the derivative of the activation function of the output neuron 214, $y_{desired}$ is the desired output of the output neuron 214, and y is the actual output of the output neuron 214.

Conversely, if the input neurons 212 or the output neuron 214 form hidden layers, the error $e_{hidden}$ of an arbitrary hidden layer is given by:

$$e_{hidden} = \phi'(w_{hidden-to-next} * e_{next}) \quad (5)$$

where $w_{hidden-to-next}$ are the weights from the arbitrary hidden layer and the next layer, and $e_{next}$ is the error signals from the next layer. $\phi'$ is, again, the derivative of the activation function of the neurons in the arbitrary hidden layer. From Equation (5), it is understood that each error signal is calculated from the error signal of the subsequent layer. Therefore, the error signals of the neural network 10 are calculated backwards from the last layer, or in other words, by error backpropagation.

In Equation (3), $\Delta G$ may be a positive or negative value depending on the signs of $\varepsilon$, x, and e. For this reason, the weights 13 of the neural network 10 preferably range between a negative minimum and a positive maximum so that the weights 13 may be positive or negative following the demands of the training algorithm. In the memristive neuromorphic circuit 200 of FIG. 5, this is implemented by using the differential pairs of memristive devices 213. As shown in FIG. 5, each differential pair of memristive devices 213 includes a memristive device with an instantaneous conductance of $G^+$ and a memristive device with an instantaneous conductance of $G^-$. It should be noted that both $G^+$ and $G^-$ are, in practice, positive values, and the sign notations are for labeling purposes as will become apparent in the following explanation.

In order to sum up the outputs of each input neuron 212 during a feedforward operation of the neural network 10, the differential pairs of memristive devices 213 are connected to summing op-amp circuits 220. The summing op-amp circuits 220 may be configured as typical negative feedback summing amplifiers. In the present embodiment, preferably two summing op-amp circuits 220 are provided for each output neuron 214, with one summing op-amp circuit 221 for summing all voltage signals passing through $G^+$ conductances, and another summing op-amp circuit 222 for summing all voltage signals passing through $G^-$ conductances, as shown in FIG. 5. The pair of summing op-amp circuits 220 are then connected to a unity gain differential amplifier 230, whose configuration is preferably typical (e.g., an op-amp with unity gain feedback resistors) and therefore details thereof are omitted for brevity.

Here, by individually adjusting the instantaneous conductances $G^+$ and $G^-$ for each input voltage signal, the overall instantaneous conductance G of each differential pair of memristive devices 213 may be a positive value (i.e., the differential amplifier 230 outputs a positive voltage) or a negative value (i.e., the differential amplifier 230 outputs a negative voltage). In other words, a given differential pair of memristive devices 213 may represent an overall conductance ranging from $-(G_{MAX}-G_{MIN})$ to $(G_{MAX}-G_{MIN})$, where $G_{MIN}$ and $G_{MAX}$ are the minimum and maximum instantaneous conductance values of either memristive device in each differential pair 213.

FIG. 5 also shows exemplary electrical components of the memristive neuromorphic circuit 200 for carrying out the aforementioned error propagation operation of the neural network 10. The input neurons 212 and the output neuron 214 are each shown in FIG. 5 as having an activation function $\phi$ for feedforward and a derivative of the activation function $\phi'$ for error backpropagation. In the present embodiment $\phi$ and $\phi'$ may be implemented as separate ICs, or may be implemented as a single IC.

Still referring to FIG. 5, an error signal is backpropagated through the $\phi'$ of the output neuron 214. Then, the error signal is split into complimentary signals (non-inverted and inverted) by an inverting gate 240. Thereafter, the non-inverted error signal is backpropagated through the $G^+$ memristive devices, and the inverted error signal is backpropagated through the $G^-$ memristive devices. Summing op-amp circuits 250 are provided for each of the input neurons 212 in order to sum up the non-inverted and inverted error signals after passing through the differential pairs of memristive devices 213. Then, the summed up error signal is backpropagated through the $\phi'$ of each input neuron 212, and may continue to backpropagate through the neural network 10.

Further, as shown in FIG. 5, throughout the backpropagation path, switches 260 are provided. The switches 260 are open (or off) during feedforward to avoid carrying the feedforward signals. Then, the switches 260 are closed (or on) during error backpropagation. In a modified aspect of the present embodiment, some or all of the switches 260 may be not provided, and may instead be internalized in each neuron circuit of the input neurons 212 and the output neuron 214.

Further, while not illustrated, sensing circuitry is provided to sense the input signals (voltage) and the error signals (voltages) throughout the memristive neuromorphic circuit 200 of FIG. 5. The sensing circuitry may be integrated with the input neurons 212 and the output neuron 214, or may be provided separately.

The circuit layout shown in FIG. 5 is representative and should be not construed as limiting. A number of alternative configurations that provide equivalent, or substantially equivalent, function are contemplated. For example, in FIG. 5, the feedforward input voltages are sent through the differential amplifier 230 while the backpropagation error voltages are split into complimentary signals by the inverting gate 240. However, equally applicable to the present disclosure is the reverse, i.e., where the feedforward input voltages are split into complimentary signals by an inverting gate, sent through respective G+ and G− memristive devices, then simply summed together. Then, the backpropagation error voltages are sent directly through G+ and G− memristive devices, and thereafter are subtracted by a differential amplifier.

It should be noted that both the feedforward operation and the error backpropagation operation are "read" operations, in that read signals are propagated through the neural network 10 without disturbing the weights 13. As such, the magnitudes of the input and error signals are preferably clipped to just below $V^{TH}$. Here, the input and error signals may be clipped in a variety of manners. For example, a hardware solution may be implemented by simply setting the rail voltage of the various read operation electrical components in the memristive neuromorphic circuit 200 of FIG. 5 to be just below $V^{TH}$. In other words, even if, for example, the error e as calculated from Equation (4) or (5) is greater than $V^{TH}$, the corresponding hardware would saturate and only output just below $V^{TH}$.

Alternatively, voltage buffer circuits (not illustrated) having a saturation voltage of just below $V^{TH}$ may be provided in advance of each differential pair 213 terminal to ensure that the differential pairs 213 are not inadvertently disturbed during feedforward or error backpropagation. Further alternatively, more sophisticated methods of voltage control may be implemented. For example, at each layer, all input or error signals may be normalized together such that the highest input or error signal is scaled to just below $V^{TH}$. This normalization process would require additional processing circuitry (e.g., a microprocessor) but would allow for more accurate propagation of signals.

In order to train the memristive neuromorphic circuit 200, training circuitry (not illustrated) is also provided for applying training voltages directly across each memristor of the differential pairs 213. During training, a desired conductance change ΔG for a particular differential pair 213 is simply applied in opposite directions for the G+ and G− memristive devices, since the G+ and G− memristive devices of each differential pair 213 see the same input voltage but opposite error voltages.

It should be noted that, as shown in FIG. 5, each individual G+ or G− memristive device shares its terminals with other individual G+ or G− memristive devices. Therefore, if a training voltage that exceeds $V^{TH}$ is applied to one terminal of a memristive device, other memristive devices that share the same terminal (so-called "half-selected devices") may be inadvertently disturbed. For this reason, training is preferably conducted with a voltage biasing scheme, where each training voltage is split into two complimentary voltages applied to either terminal of a memristive device to be trained. Each complimentary voltage is ensured to be below $V^{TH}$, while the overall training voltage ensure to be above $V^{TH}$. In other words, if the complimentary voltages are equal, then the training voltage is ensured to be just below $2V^{TH}$.

To do so, the training voltages may be clipped (i.e., voltages that exceed their respective limits are set to just within those limits on an individual basis), normalized (i.e., for one layer, the highest training voltage is set to just below $2V^{TH}$, and all other training voltages are scaled by the same factor), or a combination of clipping and normalizing. The clipping and normalizing of training voltages is preferably performed layer by layer, but may be performed globally as well, i.e., for all training voltages in the neural network 10 per iteration of training. By using this voltage biasing scheme, any specific memristive device may be trained without disturbing half-selected devices.

Figure 6:
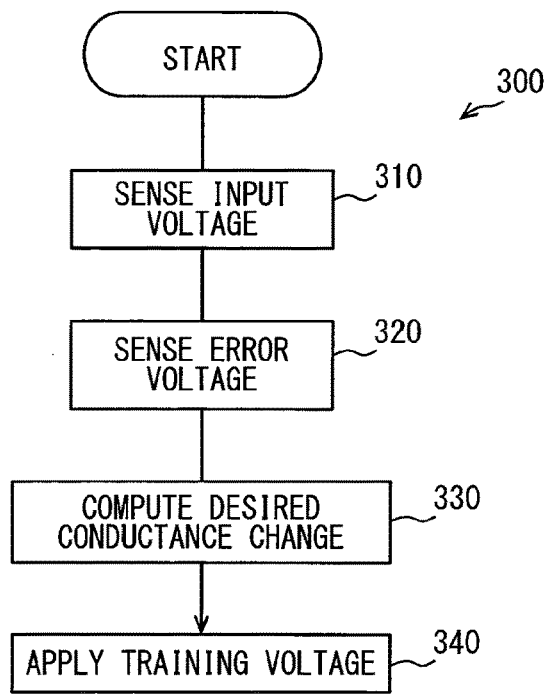
FIG. 6 is a flowchart showing a training process in accordance with the first embodiment.

A process 300 for training a memristive neuromorphic circuit implementing the neural network 10 of the present embodiment will be explained with reference to FIG. 6. The process 300 is not to be construed as limited to a particular actor. For example, in one embodiment to be described later, one or more steps, or substeps, of the process 300 may be carried out by a controller, automatically or otherwise. However, a variety of actors, and combinations thereof, are contemplated.

The process 300 begins at step 310, where an input voltage is sensed at a first terminal of a particular memristive device during a feedforward operation of the neural network 10. This sensed input voltage corresponds to x as defined with respect to Equation (3). Further, "a particular memristive device" here corresponds to an arbitrary weight 13 in the neural network 10.

The process 300 then continues to step 320, where an error voltage is sensed at a second terminal of the particular memristive device during an error backpropagation operation of the neural network 10. This sensed error voltage corresponds to e as defined with respect to Equation (3). Once the error voltage is sensed, the process 300 continues to step 330.

At step 330, a desired conductance change for the particular memristive device is computed in accordance with a training rule (e.g., backpropagation) and based on the sensed input voltage and the sensed error voltage. The desired conductance change may correspond to ΔG as defined with respect to Equation (3). However, the desired conductance change is not limited to the form of a singular value such as ΔG. Instead, the desired conductance change may be computed in a variety of forms that are related to ΔG as will be explained later.

Then, the process 300 continues to step 340, where a training voltage is applied to the particular memristive device, the training voltage being proportional to a logarithmic value of the desired conductance change. For example, if the desired conductance change is computed as ΔG, then the training voltage may be directly obtained from a conductance map that maps V with log(ΔG), such as that of FIG. 4.

It should be noted that in step 340, since the training voltage is proportional to the log of ΔG, the instantaneous conductance G of the particular memristive device is not a factor. In other words, step 340 applies open-loop control to the neural network 10. As such, the process 300 does not require complex feedback tuning circuitry, scales well with the size of the neural network 10, and may iterate relatively quickly.

In the present embodiment, the training voltage may be applied in a variety of manners. In one aspect of the present embodiment, the neural network 10 is trained with stochastic backpropagation training, which is sometimes referred to as "online training". In stochastic training, the weights 13 of the neural network 10 are updated after every round of feedforward and error backpropagation operations. In the present aspect, step 330 of the process 300 computes the desired conductance change as the two sensed values x and e directly. In other words, the ΔG value of Equation (3) is not specifically computed. Then, at step 340, the training voltage V is correspondingly split into $V_x$ and $V_e$, in the form of:

$$V_x \sim \log(x), V_e \sim -\log(e) \qquad (6)$$

where "~" defines a proportional relationship. Here, the values of $V_x$ and $V_e$ may also be directly obtained from a conductance map such as that of FIG. 4, since Equation (6) is also in the form of a proportional logarithmic function. Then, $V_x$ and $V_e$ are applied across the two terminals of the particular memristive device being trained. Accordingly, the particular memristive device sees an overall training voltage of V. In this case, the overall conductance change in the particular memristive device is still the desired conductance ΔG. This is because the training voltage V can be given as:

$$V \sim \log(x) + \log(e) \qquad (7)$$

which, using the Product Property of logarithmic functions, simplifies into:

$$V \sim \log(x*e) \qquad (8)$$

then, substituting in Equation (3) into Equation (8), the resulting relationship is:

$$V \sim \log(\Delta G) \qquad (9)$$

where the learning rate term ε may be disregarded since Equations (7) to (9) already define proportional relationships. In other words, while the training voltage V is physically applied as complimentary voltages $V_x$ and $V_e$ across the two terminals of the particular memristive device, the training voltage V is also, in effect, proportional to a logarithmic value of the desired conductance change ΔG.

$V_x$ and $V_e$ are preferably below $V^{TH}$ in order to not disturb half-selected devices, while the training voltage V is preferably above $V^{TH}$ to ensure that a conductance change is effected. Accordingly, the present aspect also implements a voltage biasing scheme suitable for neural network configurations having half-selected devices (e.g., when differential pairs are used). In the present aspect of the first embodiment, the training voltage V is applied after each iteration of feedforward and error backpropagation operations by directly using the sensed input voltage x and error voltage e. As a result, the training process is greatly simplified as complex circuitry for, e.g., storing and processing intermediate sensed values, or calculating ΔG values specifically, may be omitted.

In another aspect of the present embodiment, the neural network 10 is trained with batch backpropagation training. In batch training, the weights 13 of the neural network 10 are updated after a plurality of rounds (or a "batch") of feedforward and error backpropagation operations. Specifically, in the present aspect, steps 310 and 320 of the process 300 are repeated for a plurality of input patterns in order to sense a plurality of input voltages x and error voltages e. Then, in step 330, a batch conductance change value $\Delta G_{BATCH}$ is calculated for the particular memristive device as:

$$\Delta G_{BATCH} = \Sigma x*e \qquad (10)$$

where x and e correspond to the sensed input and error voltages for each of the input patterns, and Σ indicates summing over the plurality of input patterns. In other words, $\Delta G_{BATCH}$ is calculated over the entire batch of input patterns.

Then, in step 340, the training voltage V is obtained as a proportional logarithmic value of $\Delta G_{BATCH}$ by, for example, using a conductance map as that of FIG. 4. Thereafter, the training voltage V is applied to the particular memristive device being trained in order to effect the desired conductance change ΔG. In the present aspect of the first embodiment, the training voltage is preferably clipped and/or normalized to be between $V^{TH}$ and $2V^{TH}$ such that a voltage biasing scheme as previously explained is used.

Figure 7:
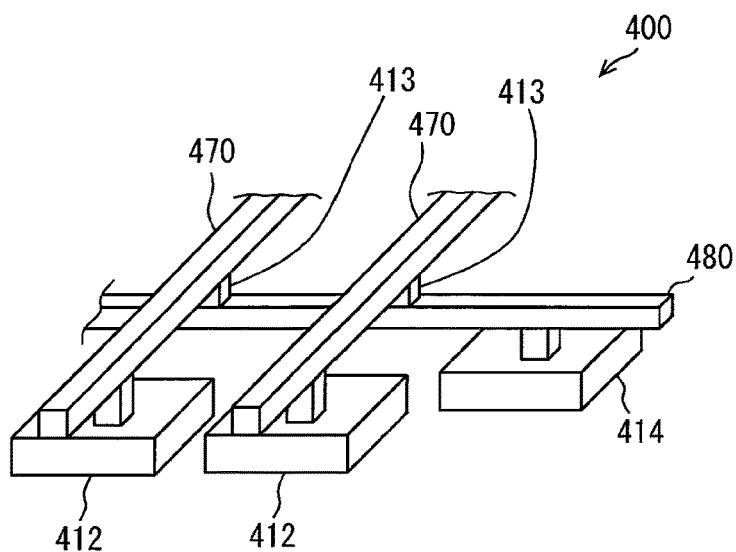
FIG. 7 a perspective view showing a memristive neuromorphic circuit in accordance with a second embodiment of the present disclosure.

Next, the neural network 10 of a second embodiment of the present disclosure will be explained. FIG. 7 is a perspective view showing the neural network 10 of the second embodiment physically implemented as a hybrid CMOS-memristive crossbar circuit 400, which is a memristive neuromorphic circuit. The crossbar circuit 400 includes a plurality of input neurons 412, a plurality of weights (memristive devices 413), and a plurality of output neurons 414 (one illustrated) as in the first embodiment. Further, in the second embodiment, the individual configurations and properties of the input neurons 412, the output neurons 414, and the memristive devices 413 are preferably the same as those in the first embodiment.

In FIG. 7, an input voltage is propagated through the crossbar circuit 400 by traversing through the input neurons 412, an input crossbar nanowire 470, the memristive devices 413, an output crossbar nanowire 480, and then the output neurons 414, in this order. Consistent with the schematic view of FIG. 1, FIG. 7 also shows that multiple input neurons 412 are connected to each output neuron 414 through respective memristive devices 413. To be clear, the crossbar nanowires 470, 480 of FIG. 7 do not constitute specific elements in the neural network 10, and merely act as volume-efficient, high-density conductors to cross-connect the input neurons 412 with the output neurons 414 through the memristive devices 413. In this case, the crossbar configuration of FIG. 7 enables production of a reliable, high-density neural network that includes a large number of neurons in a small physical package.

Figure 8A:
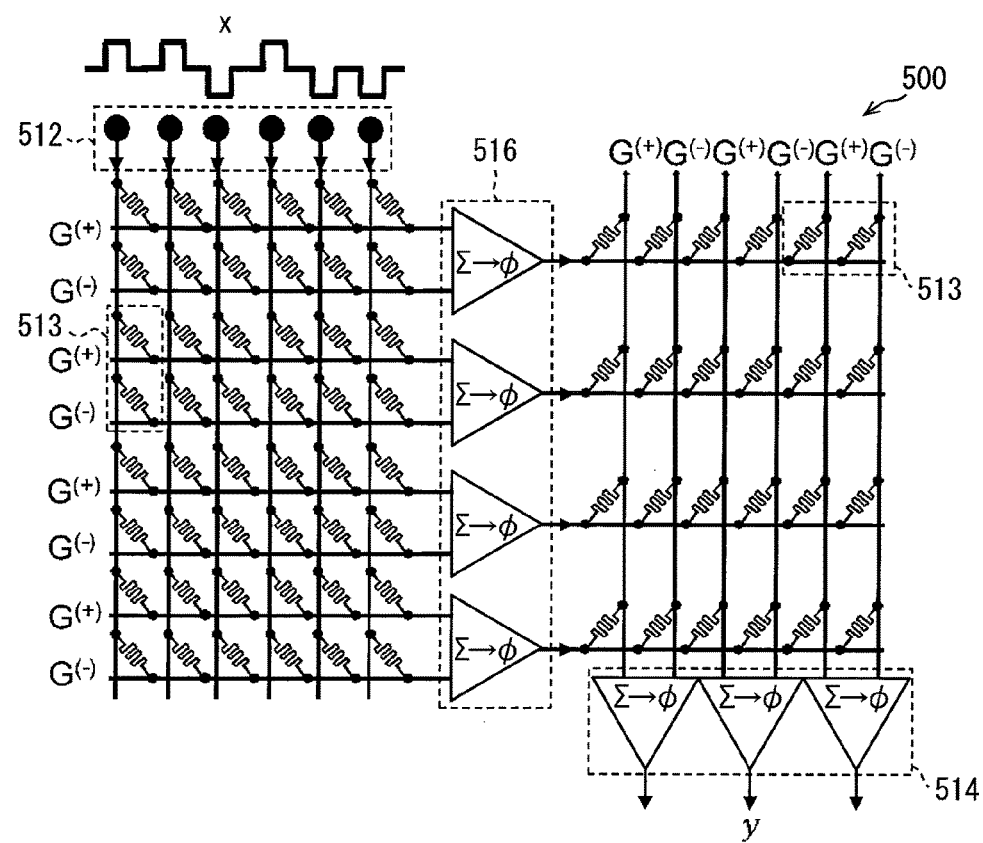
FIG. 8A is a schematic view showing the memristive neuromorphic circuit of the second embodiment during a feedforward operation.
Figure 8B:
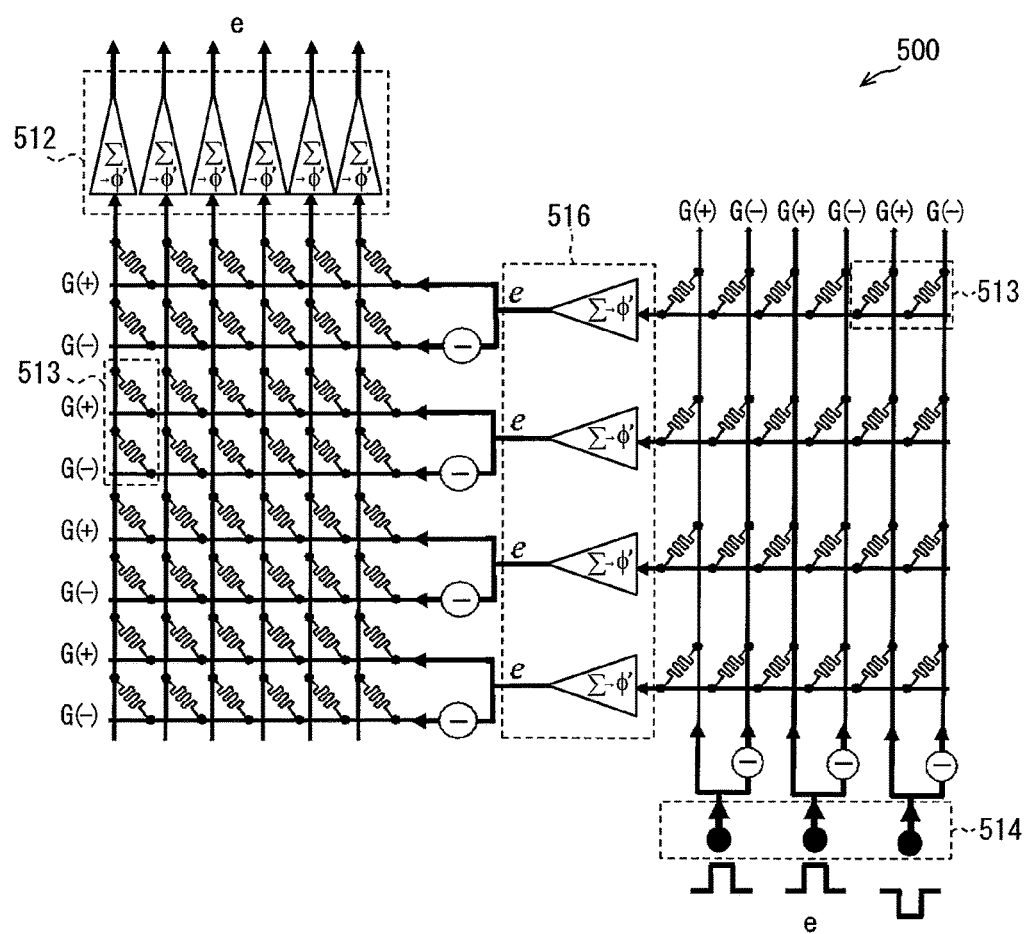
FIG. 8B is a schematic view showing the memristive neuromorphic circuit of the second embodiment during an error backpropagation operation.

FIGS. 8A and 8B shows an exemplary crossbar circuit 500 implementing a three-layer neural network with differential pairs of memristive devices 513 as weights (in the figures, only two exemplary pairs are denoted with reference numerals to avoid needlessly complicate the figures), six input neurons 512 in the input layer, four hidden neurons 516 in the hidden layer, and three output neurons 514 in the output layer. Specifically, FIG. 8A shows the crossbar circuit 500 during a feedforward operation, and FIG. 8B shows the crossbar circuit 500 during an error backpropagation operation. The specific topology of the crossbar circuit 500 is arbitrarily chosen and exemplary in nature; the following discussion of the present embodiment may be extended to a crossbar circuit having any number of layers, neurons, and connections as known in the field of neural networks.

It should be noted that FIGS. 8A and 8B depict the same crossbar circuit 500, but are shown separately for easy of understanding. The various circuit elements in the crossbar circuit 500 correspond to those already illustrated and explained in FIG. 5, except expanded to show the physical crossbar configuration of the differential pairs of memristive devices 513. Further, sensing circuitry (not illustrated) is provided to sense input voltages and error voltages at each layer of the crossbar circuit 500. Feedforward and back-propagation operations are performed on the crossbar circuit 500 in a similar manner as previously described, and thus is omitted here for brevity. In the present embodiment, training voltages are applied directly to each memristive device through the crossbar nanowires by using training circuitry (also not illustrated).

Figure 9:
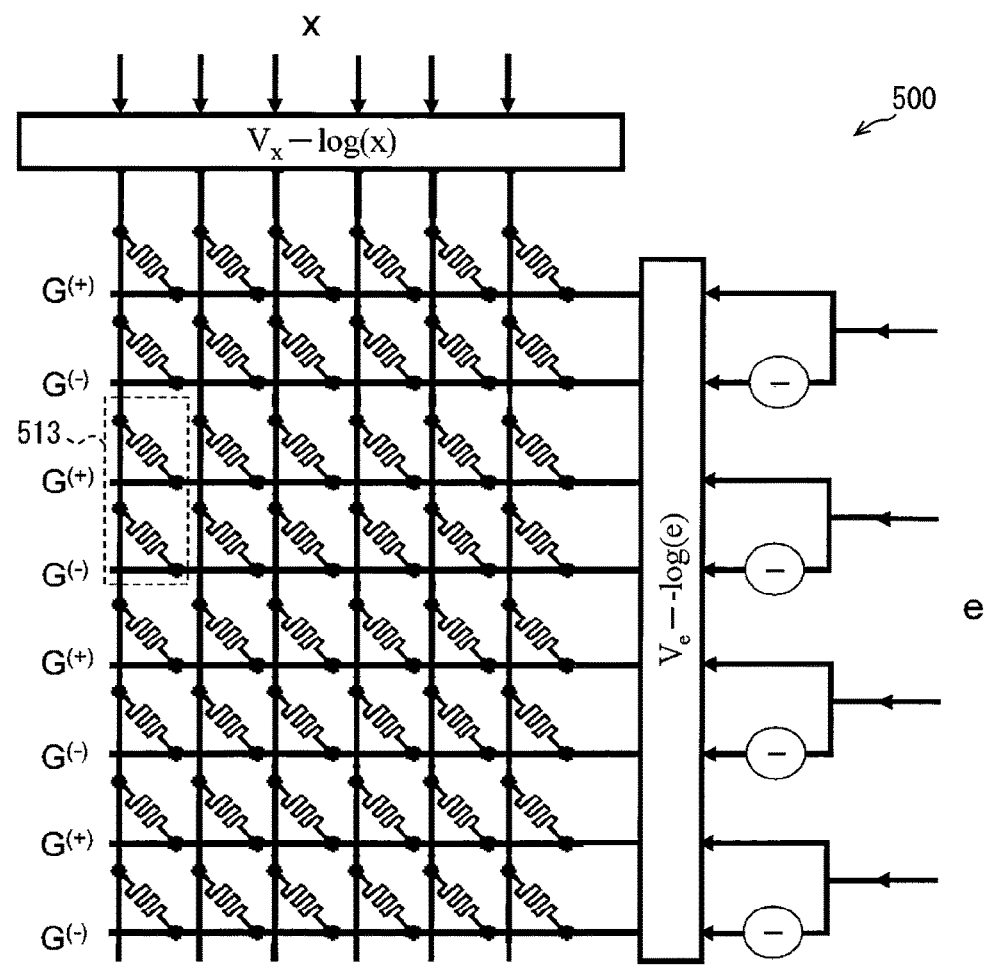
FIG. 9 is a schematic view showing the memristive neuromorphic circuit of the second embodiment during stochastic training.

In one aspect of the present embodiment, the crossbar circuit 500 is trained with the stochastic training method of the first embodiment. FIG. 9 shows an exemplary configuration for applying stochastic training voltages to differential pairs of memristive devices 513 in crossbar configuration. As shown, $V_x$ and $V_e$ in accordance with Equation (6) are applied directly to the vertical and horizontal crossbar nanowires, respectively, such that each memristive device sees an overall voltage corresponding to its input and error voltages x and e.

However, since $V_x$ and $V_e$ may have different signs and magnitudes for each memristive device, it is of course generally not possible to train all of the memristive devices of the crossbar circuit 500 concurrently. Conversely, it is not preferable to train each memristive device one-by-one, as doing so may consume an impractical amount of time and thus prevent the neural network 10 from scaling well into large number of layers or neurons.

The present aspect of the second embodiment provides a method for training the crossbar circuit 500 in four steps. In the crossbar circuit 500, there are only four possible states for the polarities of the input data (i.e., x and e) for each memristive device: positive x and negative e (RESET), negative x and positive e (RESET), positive x and positive e (SET), and negative x and negative e (SET). Moreover, there must be an equal number of memristive devices to be SET and RESET due to the use of the differential pairs 513. Specifically, for each differential pair 513, the memristive device on the G+ crossbar nanowire will be trained in the opposite direction as its counterpart on the G– crossbar nanowire. This is because, as shown in FIGS. 8A and 8B, the feedforward input voltage x is the same for the G+ and G– memristive devices of each differential pair 513, while the backpropagated error voltage e is non-inverted for the G+ memristive devices, and inverted for the G– memristive devices. Thus, ΔG as calculated from Equation (3) will always have different signs (i.e., be in opposite directions) for the G+ and G– memristive devices of each differential pair 513.

Figure 10A:
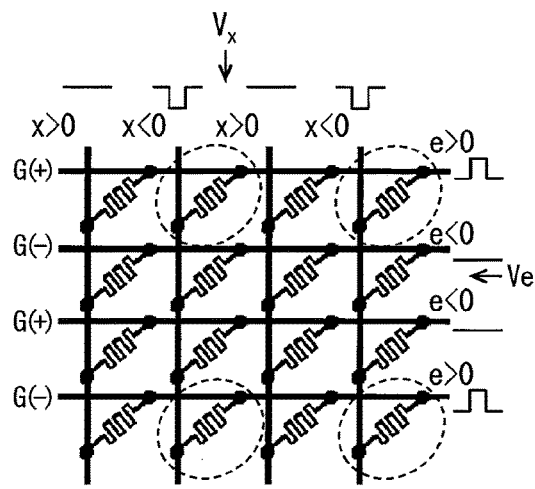
FIGS. 10A, 10B, 10C, and 10D are schematic views showing the memristive neuromorphic circuit of the second embodiment during stochastic training.
Figure 10B:
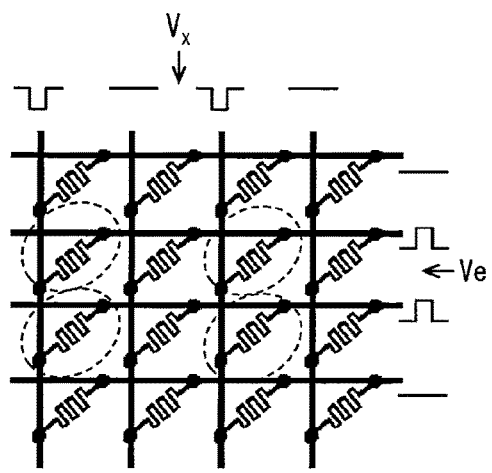
Figure 10C:
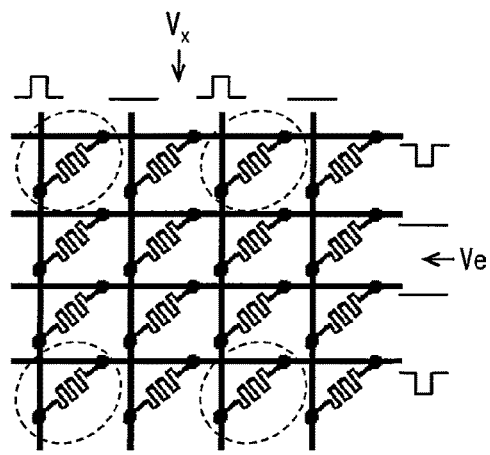
Figure 10D:
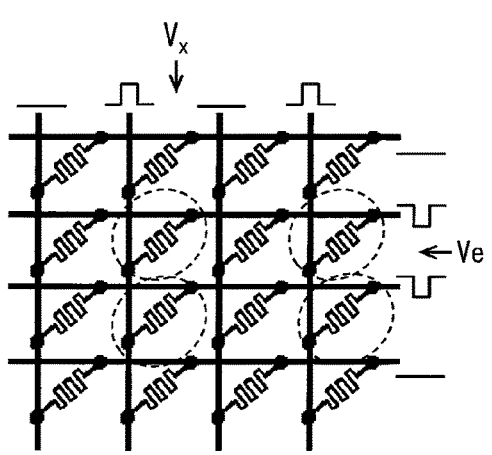

Taking the above into account, FIGS. 10A to 10D show a process for training the crossbar circuit 500 according to the present aspect of the second embodiment. FIG. 10A shows the polarities of the input data for each crossbar nanowire (i.e., the polarities of x and e), as well as whether each row is connected to G+ or G– memristive devices. These notations are omitted from FIGS. 10B to 10D for brevity. At a first time step in FIG. 10A, RESET training voltages are applied to memristive devices having negative x and positive e. Next, at a second time step in FIG. 10B, RESET training voltages are applied to memristive devices having positive x and negative e. Then, at a third time step in FIG. 10C, SET training voltages are applied to memristive devices having positive x and positive e. Finally, at a fourth time step in FIG. 10D, SET training voltages are applied to memristive devices having negative x and negative e. In each of FIGS. 10A to 10D, the memristive devices being trained are shown with a dashed outline. As a result, all of the differential pairs in the crossbar circuit 500 are trained in four steps.

FIGS. 10A to 10D are ordered arbitrarily. The memristive devices of the four states of input data may be trained in any order. Further, the stochastic training method of the present disclosure preferably uses a voltage biasing scheme as described previously, thus the half-selected memristive devices shown in each of FIGS. 10A to 10D are not disturbed.

The present aspect of the second embodiment effectively eliminates the need for performing matrix multiplication on the sensed input voltages x and the sensed error voltages e. Specifically, typically the input and error voltages are matrix multiplied to generate a desired conductance change ΔG for each memristive device. In contrast, the process 300 of the present aspect directly applies complimentary voltages $V_x$ and $V_e$ to the crossbar circuit 500 in four steps, which according to Equations (7) to (9) results in effecting the desired conductance change ΔG in every memristive device, without the need to specifically calculate ΔG by, e.g., matrix multiplication. As such, the present aspect of the second embodiment provides for a fast and robust method of training the crossbar circuit 500.

In another aspect of the present embodiment, the crossbar circuit 500 is trained with the batch training method of the first embodiment. Here, as in the first embodiment, a training voltage V for each memristive device is obtained from the batch conductance change $\Delta G_{BATCH}$ computed for each memristive device. In this case, matrix multiplication circuitry (not illustrated) is provided to matrix multiply the input voltages x with the error voltages e to computer intermediary ΔG values after each iteration of feedforward and error backpropagation.

In the present aspect of the second embodiment as well, the training voltage V may have different signs and magnitudes for each memristive device. Thus, it is of course generally not possible to train all of the memristive devices of the crossbar circuit 500 concurrently. Conversely, it is not preferable to train each memristive device one-by-one, as doing so may consume an impractical amount of time and thus prevent the neural network 10 from scaling well into large number of layers or neurons.

Figure 11A:
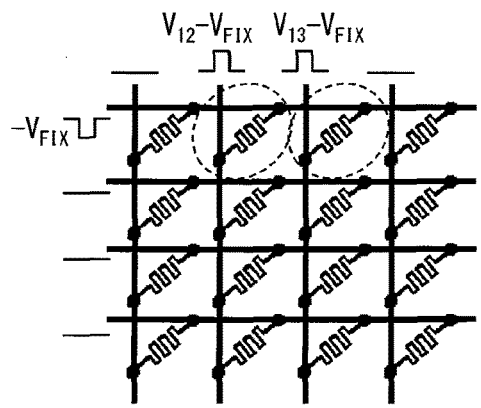
FIGS. 11A and 11B are schematic views showing the memristive neuromorphic circuit of the second embodiment during batch training.
Figure 11B:
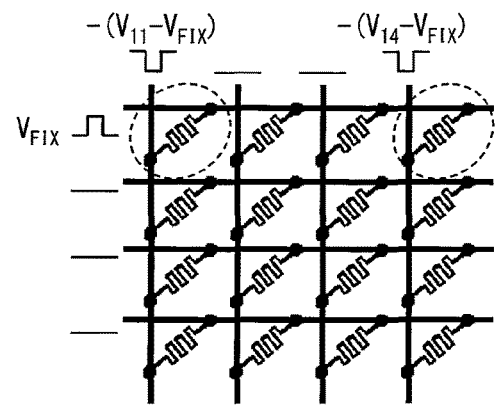

The present aspect provides a method for batch training the crossbar circuit 500 by updating one crossbar nanowire at a time, shown in FIGS. 11A and 11B. In FIGS. 11A and 11B, training voltages for each memristive device is denoted with typical matrix notation where $V_{ij}$ is the training voltage for the memristive device in the i-th row and j-th column, counting from the top left. Specifically, in the present aspect, memristive devices are updated row-by-row, wherein each row is updated in two steps. In the first step, shown in FIG. 11A, a negative fixed voltage $V_{FIX}$ is applied to the horizontal crossbar nanowire. Then, positive RESET training voltages Vij, after subtracting the fixed voltage $V_{FIX}$, are applied to the vertical crossbar nanowires for memristive devices to be RESET. The updated devices are shown in dashed outlines.

Next, shown in FIG. 11B, a positive fixed voltage $V_{FIX}$ is applied to the same horizontal crossbar nanowire. Then, negative SET training voltages, after subtracting the fixed voltage $V_{FIX}$, are applied to the vertical crossbar nanowires for memristive devices to be SET. Again, the updated devices are shown in dashed outlines. Accordingly, one row of memristive devices are updated. The method then continues in the same manner row-by-row until the entire crossbar circuit 500 is trained.

In the present aspect, the fixed voltage $V_{FIX}$ applied to the horizontal crossbar nanowires may be set in a variety of manners in accordance with a voltage biasing scheme. Preferably, the fixed voltage $V_{FIX}$ is set to just below $V^{TH}$, so that half-selected devices are undisturbed. Then, on the vertical crossbar nanowires, $V_{ij} - V^{TH}$ is applied. Since the training voltages $V_{ij}$ are preferably clipped and/or normalized to, at most, just below $2V^{TH}$ in accordance with the voltage biasing scheme of the present disclosure, the half-selected devices on the vertical crossbar nanowires will also see just below $V^{TH}$ in the worst case, and are undisturbed. In alternative implementations, the fixed voltage $V_{FIX}$ may be set to well below $V^{TH}$ for safety. For example, the fixed voltage $V_{FIX}$ may be set to $V^{TH}/2$. In this case, the training voltages $V_{ij}$ are clipped and/or normalized to a lower limit as well to ensure that half-selected devices are not disturbed even in the worst case.

It should be noted that the depictions in FIGS. 11A and 11B are exemplary in nature. As an alternative, the crossbar circuit 500 may be trained column-by-column instead of row-by-row. Moreover, the order in which the columns or rows are trained may be arbitrarily determined. Even further, the crossbar circuit 500 may be trained by first applying one of SET or RESET pulses for each row or column, and then applying the other one of SET or RESET pulses for each row or column.

Figure 12:
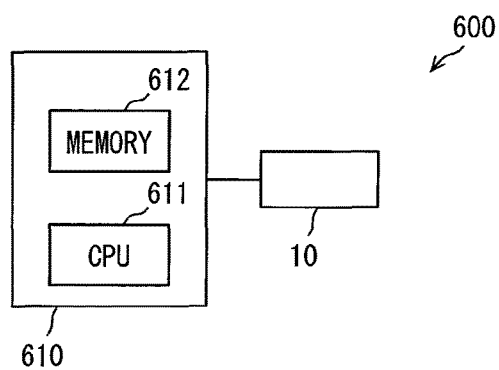
FIG. 12 is a schematic view showing a control system in accordance with the present disclosure.

The above embodiments of the present disclosure may be implemented as a control system 600. FIG. 12 is a schematic view showing the control system 600 including a controller 610 that has a CPU (or processor) 611 and a memory 612. The controller 610 is in bi-directional communication with the neural network 10. The CPU 611 of the controller 610 reads programs and data stored on the memory 612 to operate the controller 610. Here, the neural network 10 may be configured in accordance with any of the above embodiments.

The controller 610 preferably includes drive circuitry and sensing circuitry (not illustrated) to read and write the neural network 10. Specifically, the controller 610 is configured to read the neural network 10 by applying input signals thereto during feedforward of input patterns and by applying an error signal thereto during error backpropagation. The controller 610 uses the CPU 611 to compute desired conductance change values based on sensed input voltages and sensed error voltages during the feedforward and error backpropagation operations of the neural network 10. Additionally, based on a training rule, such as backpropagation, the controller 610 is configured to write to the memristive devices of the neural network 10 by preferably using a conductance map stored in the memory 612 (i.e., by using a conductance map as shown in FIG. 4). To implement backpropagation through batch training, the controller 610 may also include matrix multiplication circuitry. Accordingly, the control system 600 may implement any of the embodiments discussed previously.

In addition, the layout of the control system 600 shown in FIG. 12 is exemplary and thus should not be construed as limiting. A number of alternative configurations are contemplated and are applicable to the present disclosure. In one alternative embodiment, the control system 600 is implemented as an integrated neuromorphic system where memristive devices form both the neuromorphic core (i.e., providing the analog weights 13 in the neural network 10) and the CPU core (i.e., providing digital memory). In this case, a separate CMOS memory such as SRAM or embedded flash is not required, and the control system 600 may be manufactured through fewer processes to save costs.

The present disclosure is not limited to the above embodiments, and a variety of modifications which do not depart from the gist of the present disclosure are contemplated.

In a modified aspect of the above embodiments, the stochastic and batch training methods may be implemented with fixed-amplitude training. In fixed-amplitude training, only the sign information of the desired conductance change $\Delta G$ is used, and depending on a sign, either a predetermined SET voltage or a predetermined RESET voltage is applied to each memristive device.

In yet another modified aspect of the above embodiments, the various components of the neural network 10, including the input neurons 12, the output neurons 14, any crossbar nanowires, and the weights (memristive devices) 13, may be integrally formed in a single IC. As a result, the physical package size of the neural network 10 may be reduced, and the neural network 10 may be less susceptible to environmental effects such as changes in temperature. Alternatively, the input neurons 12 and the output neurons 14 of the neural network 10 may be integrally formed as a neuron circuit.

In yet another modified aspect of the above embodiments, the activation functions $\phi$, and the derivatives $\phi'$ thereof, of the input neurons 12 and the output neurons 14 may be implemented as separate CMOS devices. For example, a dedicated activation function IC may be provided at appropriate locations to transform voltage signals in the neural network 10.

In yet another modified aspect of the above embodiments, the learning rate $\varepsilon$ in Equation (3) is adjusted by adjusting the duration $\Delta t$ of the training voltage. As explained previously, the duration $\Delta t$ may be approximated as a linear scaling of $\Delta G$, and thus is suitable for approximating the learning rate $\varepsilon$.

In one modified aspect of the second embodiment, the weights 13 of the neural network 10 are trained one-by-one. In this case, the amount of time needed to complete the training may be increased, but a suitable complimentary pairs of voltages may be applied for each memristive device. For example, given a training voltage V that is between $V^{TH}$ and $2V^{TH}$, a suitable complementary pair of voltages $V/2$ and $-V/2$ may be applied across the memristive device to be trained. In this case, the complementary pair of voltages are as far from $V^{TH}$ as possible, and thus reduces the likelihood of half-selected devices being disturbed.

The above described embodiments and modifications may also be combined in various manners even if such a combination is not specifically mentioned, given that such a combination does not depart from the gist of the present disclosure. Accordingly, the scope of the embodiments should not be limited to the discussion above, but should rather include a wide range of equivalents, modifications, and combinations.

The invention claimed is:

1. A method for training a memristive neuromorphic circuit, comprising:
    sensing an input voltage at a first terminal of a memristive device during a feedforward operation of a neural network, the neural network including the memristive device and a neuron circuit connected to the memristive device;
    sensing an error voltage at a second terminal of the memristive device during an error backpropagation operation of the neural network;
    computing, in accordance with a training rule, a desired conductance change for the memristive device based on the sensed input voltage and the sensed error voltage; and
    applying a training voltage to the memristive device, the training voltage being proportional to a logarithmic value of the desired conductance change.

2. The method of claim 1, wherein
    the desired conductance change is computed as the sensed input voltage and the sensed error voltage, and the training voltage is applied as a first complimentary voltage at the first terminal of the memristive device and a second complimentary voltage at the second terminal of the memristive device.

3. The method of claim 2, wherein
the first complimentary voltage is proportional to a logarithmic value of the sensed input voltage, and
the second complimentary voltage is proportional to a logarithmic value of the sensed error voltage.

4. The method of claim 2, further comprising:
at least one of clipping and normalizing the first complimentary voltage and the second complimentary voltage such that
the first complimentary voltage is below a threshold voltage of the memristive device,
the second complimentary voltage is below the threshold voltage of the memristive device, and
a sum of the first complimentary voltage and the second complimentary voltage is above the threshold voltage of the memristive device.

5. The method of claim 1, wherein
the input voltage sensing step and the error voltage sensing step are iterated for a plurality of input patterns, and
the desired conductance change is computed as:

$$\Delta G_{BATCH} = \Sigma x^* e$$

where $\Delta G_{BATCH}$ is a batch conductance change, x and e are the sensed input voltage and sensed error voltage, respectively, of each of the plurality of input patterns, and $\Sigma$ indicates summing over the plurality of input patterns.

6. The method of claim 5, further comprising:
at least one of clipping and normalizing the training voltage to be above a threshold voltage of the memristive device and below twice the threshold voltage of the memristive device.

7. The method of claim 1, wherein
the neuron circuit includes a plurality of input neurons and a plurality of output neurons, and
the memristive device is included in a plurality of differential pairs of memristive devices cross-connecting the plurality of input neurons with the plurality of output neurons as a crossbar circuit.

8. The method of claim 7, further comprising:
at a first time step, training first memristive devices of the plurality of differential pairs of memristive devices, each of the first memristive devices having positive input voltage during the feedforward operation and positive error voltage during the error backpropagation operation;
at a second time step, training second memristive devices of the plurality of differential pairs of memristive devices, each of the second memristive devices having negative input voltage during the feedforward operation and negative error voltage during the error backpropagation operation;
at a third time step, training third memristive devices of the plurality of differential pairs of memristive devices, each of the third memristive devices having positive input voltage during the feedforward operation and negative error voltage during the error backpropagation operation; and
at a fourth time step, training fourth memristive devices of the plurality of differential pairs of memristive devices, each of the fourth memristive devices having negative input voltage during the feedforward operation and positive error voltage during the error backpropagation operation.

9. The method of claim 7, wherein
the input voltage sensing step includes sensing a plurality of input voltages at the plurality of input neurons during the feedforward operation,
the error voltage sensing step includes sensing a plurality of error voltages at the plurality of output neurons during the error backpropagation operation.

10. The method of claim 9, further comprising:
matrix multiplying the sensed plurality of input voltages with the sensed plurality of error voltages to compute a desired conductance change for each memristive device of the plurality of differential pairs of memristive devices.

11. The method of claim 10, further comprising:
at a first time step, training first memristive devices of the plurality of differential pairs of memristive devices, each of the first memristive devices having a positive desired conductance change; and
at a second time step, training second memristive devices of the plurality of differential pairs of memristive devices, each of the second memristive devices having a negative desired conductance change, wherein
the first memristive devices and the second memristive devices share a same terminal.

12. The method of claim 11, wherein
during the first time step, a negative fixed voltage is applied to the shared same terminal, and
during the second time step, a positive fixed voltage is applied to the shared same terminal.

13. A memristive neuromorphic circuit for implementing a neural network, comprising:
a memristive device;
a neuron circuit connected to the memristive device; and
a controller including a processor and a memory, wherein the controller is programmed to
sense an input voltage at a first terminal of the memristive device during a feedforward operation,
sense an error voltage at a second terminal of the memristive device during an error backpropagation operation,
compute a desired conductance change for the memristive device based on the sensed input voltage and the sensed error voltage; and
apply a training voltage to the memristive device, the training voltage being proportional to a logarithmic value of the desired conductance change.

14. The memristive neuromorphic circuit of claim 13, wherein
the memristive device is a first memristive device of a differential pair of memristive devices connected to the neuron circuit, the differential pair of memristive devices including the first memristive device and a second memristive device.

15. The memristive neuromorphic circuit of claim 14, further comprising:
a differential amplifier connected to the differential pair of memristive devices, the differential amplifier configured to calculate a difference between an output of the first memristive device and an output of the second memristive device.

16. The memristive neuromorphic circuit of claim 14, wherein the differential pair of memristive devices is a first differential pair of a plurality of differential pairs of memristive devices, and the plurality of differential pairs of memristive devices are connected to the neuron circuit.

17. The memristive neuromorphic circuit of claim 13, further including:

a plurality of crossbar nanowires, wherein the neuron circuit, the memristive device, and the plurality of crossbar nanowires are connected together as a crossbar circuit.

18. The memristive neuromorphic circuit of claim 13, wherein the neuron circuit includes at least one of an input neuron and an output neuron.

19. The memristive neuromorphic circuit of claim 18, wherein the memristive device is connected between the input neuron and the output neuron.

20. The memristive neuromorphic circuit of claim 18, wherein the input neuron, the output neuron, and the memristive device are integrally formed as a single integrated circuit.

21. The method of claim 1, wherein the training voltage may vary according the desired conductance change.

22. The memristive neuromorphic circuit of claim 13, wherein the training voltage may vary according the desired conductance change.

* * * * *